United States Patent
Huang et al.

[11] Patent Number: 5,948,032
[45] Date of Patent: Sep. 7, 1999

[54] POLYNOMIAL WINDOWING ALGORITHM FOR IMPACT RESPONSIVE ACTIVATION

[75] Inventors: Matthew Huang, Dearborn; Parag Jitendra Parikh, Northville, both of Mich.

[73] Assignee: Ford Global Technologies, Inc., Dearborn, Mich.

[21] Appl. No.: 08/822,652

[22] Filed: Mar. 24, 1997

[51] Int. Cl.$^6$ .................................................. B60R 21/32
[52] U.S. Cl. ............................. 701/47; 180/282; 280/735
[58] Field of Search ........................... 701/45, 46, 47; 180/268, 271, 282; 280/734, 735; 307/9.1, 10.1

[56] References Cited

U.S. PATENT DOCUMENTS

| | | | |
|---|---|---|---|
| 5,068,793 | 11/1991 | Condne et al. .................. | 701/45 |
| 5,394,328 | 2/1995 | Huang .............................. | 701/46 |
| 5,495,414 | 2/1996 | Spangler et al. ................. | 701/45 |
| 5,498,028 | 3/1996 | Carlin et al. .................... | 280/735 |
| 5,587,906 | 12/1996 | McIver et al. ................... | 701/36 |
| 5,606,501 | 2/1997 | Gioutsos et al. ................ | 701/36 |

*Primary Examiner*—William A. Cuchlinski, Jr.
*Assistant Examiner*—Ed Pipala
*Attorney, Agent, or Firm*—Daniel M. Stock

[57] ABSTRACT

Polynomial functions of acceleration and time are used to develop an air bag activation decision. The polynomial functions include windowing constraints, a spike detector to detect the oscillatory signal in side impacts, and an above bias delay detector to help detect low speed impacts.

4 Claims, 4 Drawing Sheets

ACCELERATION WINDOWING
ACCELERATION

ACCELERATION TIME WINDOWING

DECELERATION WINDOWING
DECELERATION

DECELERATION TIME WINDOWING

Note that the windows for the positive acceleration responses allow much higher values than the deceleration cases. This is to allow the sensor to reset if it encounters too many samples above the bias g.

POLYNOMIAL WINDOWING ALGORITHM FOR IMPACT RESPONSIVE ACTIVATION

BACKGROUND OF THE INVENTION

1. Field of the Invention

The present invention relates generally to a method for activating an occupant restraint or other impact responsive system in a passenger vehicle.

2. Prior Art

Impact responsive devices, such as air bags and fuel shut-off controls, are rapidly becoming standard features on most passenger vehicles. A conventional air bag inflates to protect the vehicle passengers in response to an acceleration force on the vehicle. Electromechanical sensors can be mounted at various locations in the vehicle outside the passenger compartment, such as on the frame rails and radiator, to detect the impact and activate the air bag.

In a collision, there are two types of crash pulses: one in the crush zone where the frontal frame structure absorbs energy in a crash, and the other in the occupant compartment where the undisturbed portion of the vehicle body remains rigid. The structural responses in the two zones are different. The crush zone undergoes rapid velocity change as it deforms early in the crash, and the occupant compartment experiences a rigid body deceleration with smaller deceleration magnitude and longer duration than those in the crush zone.

Many air bag sensors are of the ball and tube type. Inside each sensor, a gold-plated steel ball is held in place at the end of a short tube by a magnet. In a forward impact, the ball breaks free from the magnet and travels along the tube toward two electrical contacts. Crash sensors are located near the front of the vehicle and a safing sensor near the passenger compartment. The safing sensor is connected in series with the crash sensors. The air bag is deployed when at least one of the crash sensors and the safing sensor are activated and the activation times are overlapped. The safing sensor serves to confirm that a crash is so severe that it warrants an air bag deployment; and, it also serves to prevent an air bag from inadvertent deployment in case there is an electrical short circuit in the crash sensor. However, systems employing such remote electromechanical sensors require multiple sensors and complex control systems.

In view of these deficiencies, vehicle designers have attempted to implement single point sensing systems which utilize a single electronic sensor, such as an accelerometer, in the passenger compartment of the vehicle. One such system is disclosed in U.S. Pat. No. 5,068,793 issued to Condne et al. The Condne et al system utilizes a single accelerometer to generate a deceleration signal indicative of deceleration of the vehicle. The deceleration signal is then reduced by a variable deceleration threshold signal and the resulting signal is integrated over time. The variable deceleration threshold signal is a feedback signal taken from the integrated signal. When the integrated signal exceeds a triggering threshold value, an impact is detected.

Prior systems, such as the Condne et al system, are based on a time domain analysis of the deceleration signal for discriminating between must-activate impacts and must-not-activate impacts within a desired activation time.

Also known is a method for activating an impact responsive device which utilizes a single sensor, distinguishes between must-activate impacts and must-not-activate impacts, and activates the device within a desired time period. Such a method is described in U.S. Pat. No. 5,394,328, assigned to the assignee hereof, and the disclosure of which is incorporated herein by reference.

Though there have been many algorithms designed for frontal air bag deployment, few have had success in dynamic side impact and low speed crash detection. Most of these have relied on either acceleration or integrated acceleration to develop the signal to activate. This has not worked consistently because the relationship between sensor activation versus acceleration and velocity is not explicit. From examining multiple crash tests, a higher deceleration did not always indicate a larger need to activate. The high deceleration in the high speed impacts, such as 31 mph barrier tests, occurred long after the decision to activate was made. Most of the higher deceleration values found in the crash test studied indicated either noise in the data set or a side impact oscillation. These are some of the problems this invention overcomes.

SUMMARY OF THE INVENTION

An algorithm in accordance with an embodiment of this invention is developed to provide timely discrimination of low speed crashes for sensor activation. It features (1) polynomial windowing functions of acceleration and time of a signal at single point sensor location, and (2) positive spike and above-bias-delay detectors for dynamic side impact and soft crash discrimination.

A difficult task in discriminating the low speed crashes is the ability of the algorithm to differentiate the must-activate crashes such as 14 mph barrier and 19 mph pole impacts, from the must-not activate impacts such as the 8 mph barrier and dynamic side impact at 34 mph. The proposed algorithm uses the polynomial windowing (constraint) functions, coupled with the spike and bias detection, to facilitate the process.

In particular, the algorithm uses polynomial functions of acceleration and time to develop an activation decision. The polynomial function for deceleration peaks at a predefined level (e.g., 20 g) and then decreases. Though this may not accurately reflect the crash severity, it does reflect the need to activate. The time function is required so that the sensor does not activate too early. The product of the acceleration and time polynomial functions is used in the subsequent activation decision. A preset bias deceleration is used not only to signal processing of a crash event, but to detect large acceleration "spikes" that are prevalent in side impact crashes. After the detection of such spikes, the sensor will reset itself. Also, the sensor will delay activation if it encounters a number of samples above the bias. This allows it to reset in a low speed, no-activation crash such as 8 mph barrier impacts, and delay early activation of the air bag in softer crashes such as 19 mph pole and 42 mph vehicle-to-vehicle impact situations. This algorithm has worked successfully in differentiating 34 mph dynamic side impact and 8 mph barrier no-activation crashes from a 42 mph vehicle-to-vehicle, 14 mph barrier, 19 mph center pole, and 31 mph barrier must-activate situations.

This algorithm can use three methodologies. First, it uses polynomial functions of time and acceleration with windowing constraints as opposed to traditional acceleration, velocity, displacement, or energy values. Moreover, the polynomial function for acceleration is not monotonically increasing. This makes it a better predictor on when to activate than traditional algorithms. Second, it uses a spike detector in order to detect the oscillatory signal in the side impact, no-activate situations. The spike detector looks for large amplitude changes and registers them as a spike. An oscillatory signal that can approach +/−100 g is mostly found in no-activate side impact tests. Third, it uses an above bias delay detector to help detect low speed, no-activate situations. The "delay" allows a sensor to keep processing even if it knows that it should not activate in the near future.

DETAILED DESCRIPTION OF THE PREFERRED EMBODIMENT

Figure 1:
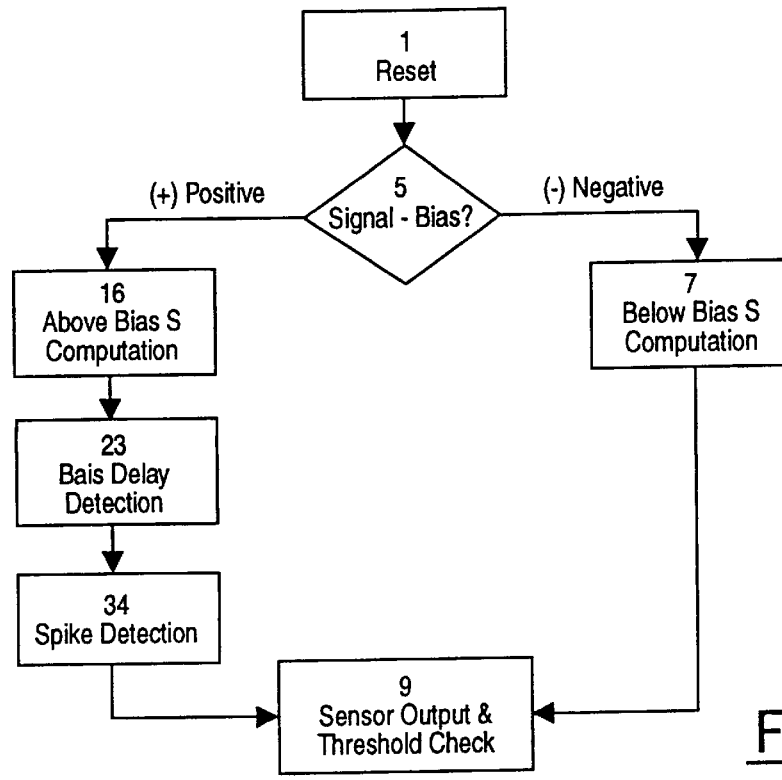
FIG. 1 is a block diagram of an algorithm function in accordance with an embodiment of this invention.

An air bag system typically includes an air bag deployment system including an associated accelerometer and electronic control module. Referring to FIG. 1, logic flow begins at a block 1 with a reset function. Logic flow then goes to a decision block 5 where a bias is subtracted from the accelerometer signal. If the resulting signal is negative, logic flow goes to a block 7 where a below bias S(t) computation is performed where S(t) is the sensor output. If the resulting signal is positive, logic flow goes to a block 16 where an above bias computation is performed. Logic flow from block 16 goes to a block 23 where there is an above-bias delay detection, to a block 34 for spike detection, and to a block 9 for sensor output and threshold check. Logic flow from block 7 also goes to block 9.

For ready reference, the following algorithm parameter list is provided.

| Parameter List | Description | Type |
| --- | --- | --- |
| t | Time. Time is a reset at the beginning of each sensor processing cycle | ms |
| a(t) | Acceleration as a function of time. This is obtained from the tunnel accelerometer | g |
| bias | A g level that defines when sensor turns on, and differentiates acceleration and deceleration | g |
| stop_time | The time that the sensor will stop a processing cycle | ms |
| min_sensor_duration | Minimum time a sensor will spend in a processing cycle | ms |
| fneg(a) | A polynomial transfer function of below bias deceleration to a Sensor Value | function |
| fneg(t) | A polynomial transfer function of sensor time for below bias deceleration to a Sensor Value | function |
| fpos(a) | A polynomial transfer function of above bias deceleration to a Sensor Value | function |
| fpos(t) | A polynomial transfer function of sensor time for above bias deceleration to a Sensor Value | function |
| pos_spike_flag | A Boolean value that equals 1 when a spike is currently occurring | Boolean |
| above_bias_count | The number of consecutive accelertion values above the bias level | counter |
| S(t) | The array of sensor output values | S |
| bias_count_limit | Number of consecutive acceleration values that signals a delay | counter |
| min_spike_amplitude | The lowest g level which determines a spike | g |
| max_spike_amplitude | The g level above which all samples are considered a spike | g |
| reset_threshold | The sensor value that indicates too much positive acceleration and causes a sensor reset | S |
| spike_count_max | Maximum number of spikes before sensor turns off | integer |
| deploy_threshold | Value which sensor output must reach to cause firing | S |
| pos_spike_count | The number of positive spikes encountered in current sensor processing cycle | counter |
| Delta t | The time between successive samples of acceleration | ms |
| offset | An offset to determine the time to begin delay to account for sensor averaging | ms |

Figure 2A:
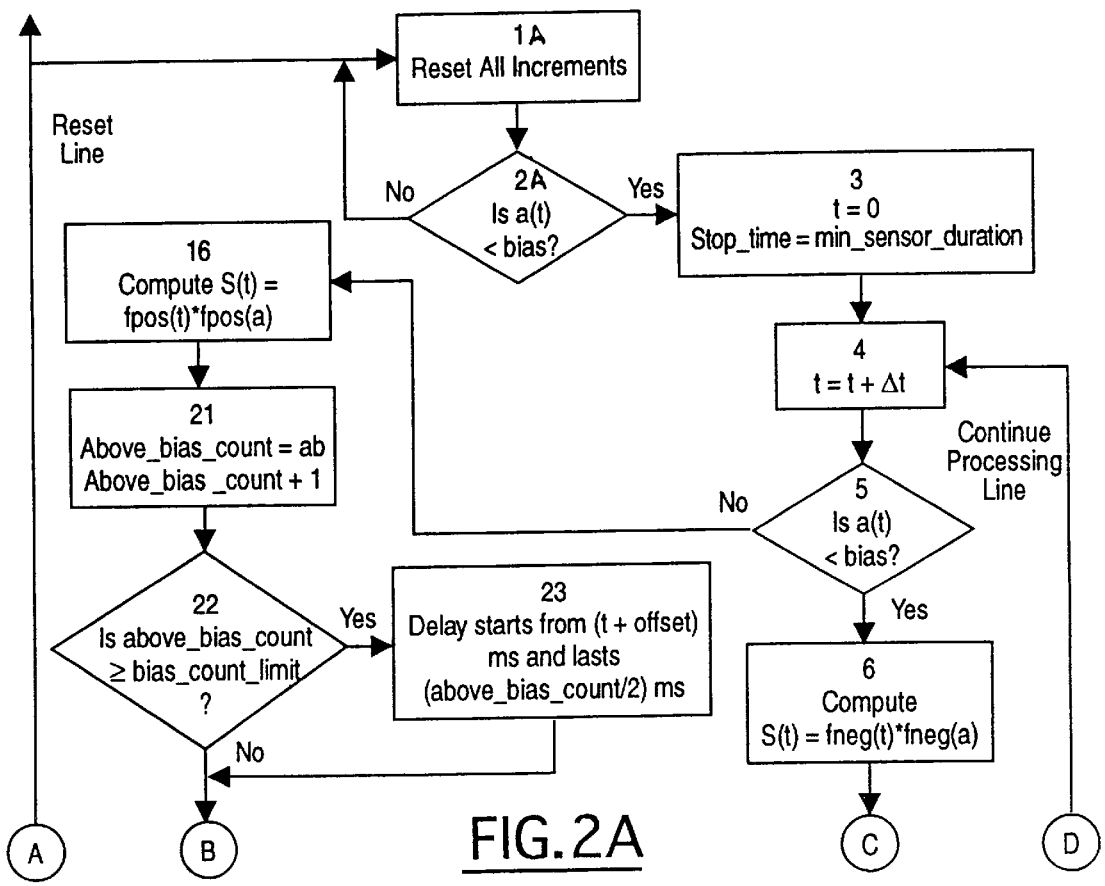
FIGS. 2A and 2B are flow charts illustrating the method of the present invention.
Figure 2B:
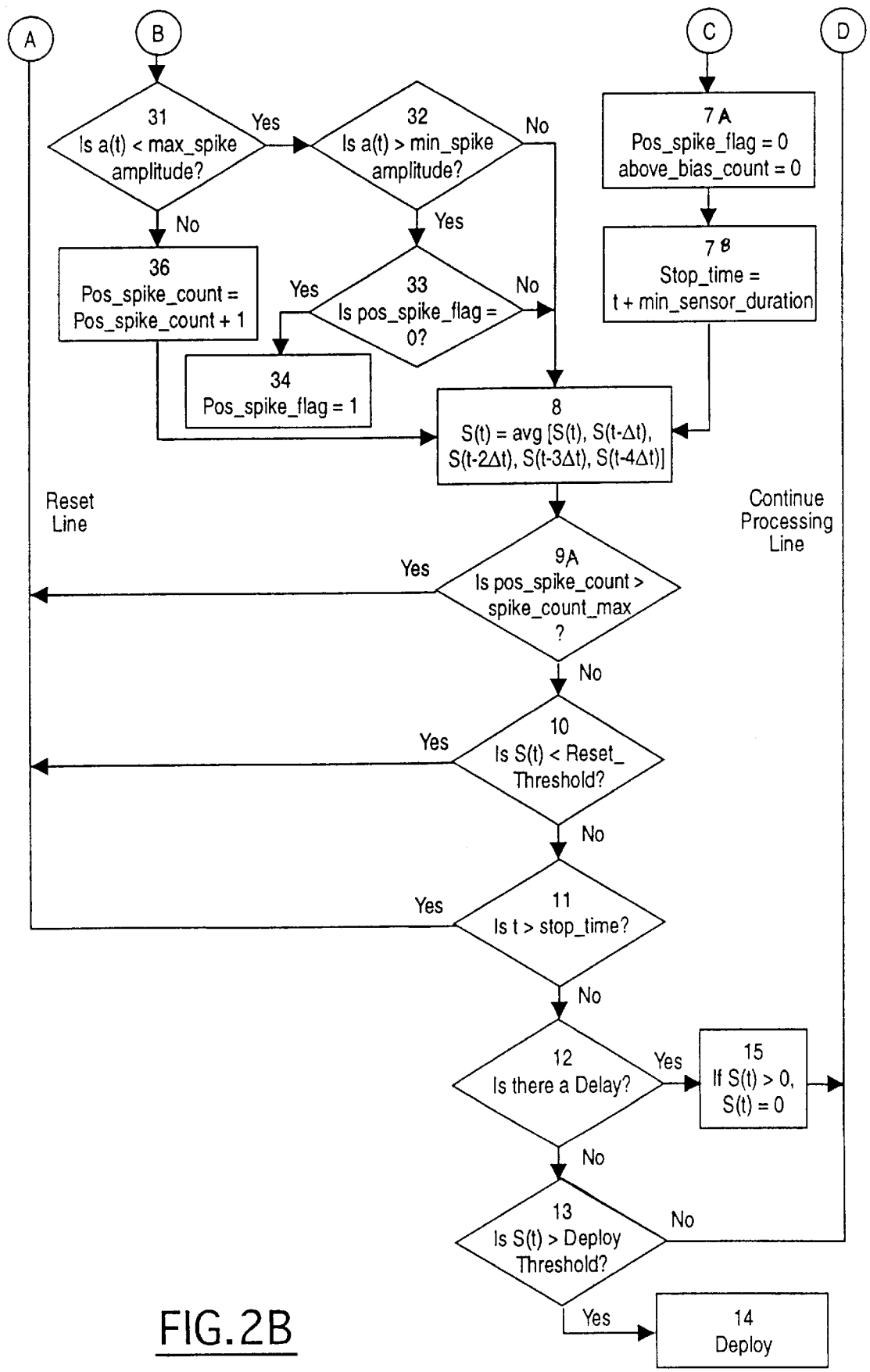

Referring to FIGS. 2A and 2B, the algorithm continuously samples the accelerometer for acceleration below the bias value (block numbers 1A, 2A). Upon finding a value below bias, logic flow goes to a block 3, the sensor time t is set to 0, and the stop time is set to the minimum sensor duration. If (a(t) -bias) is negative, then S(t), the sensor output is computed as a function of the acceleration multiplied by a function of the sensor time t (block 6). Since the acceleration is below the bias, the number of consecutive samples above the bias, "above bias count", is set to 0, as well as the presence of a positive spike, pos spike flag (block 7A). Also, the stop time is set further into the future (block 7B). S(t), the final sensor output value, is an average of the sensor output computed from the windowing functions as well as the previous four values of S(t) (block 8).

Now that the sensor value is computed, the rest of the algorithm checks for reasons to reset or to continue processing. First, the positive spike count is checked against the maximum spike count to make sure that there have not been too many positive spikes. If there were too many positive spikes, then the sensor resets (block 9A). Similarly, if S(t) is below the reset threshold; this indicates S(t) was computed from multiple above bias acceleration samples, and the sensor resets (block 10). Also, if t is greater than the stop time, the sensor will reset. The sensor will check to see if the above bias delay detector has set a delay (12). This does not cause the sensor to reset, but rather makes it delay activation by setting any positive S(t) to 0, and then continuing to process. Finally, S(t) is compared to the preset deployment threshold value, and a decision is made to activate or to continue processing the next acceleration sample (block 13).

If a sample is above the bias, it is considered positive, and a different S(t) value is computed from "fpos(a)" multiplied by "fpos(t)" (block 16). Then, the above bias delay detector is started. The above bias delay detector counts consecutive samples above the bias using the counter "above bias count" (block 21). If "above bias count" reaches the "bias count limit", then it causes a delay starting "offset" ms after the final above bias acceleration value (block 22). The duration of delay is proportional to the number of samples found consecutively above the bias (block 23).

Figure 3B:
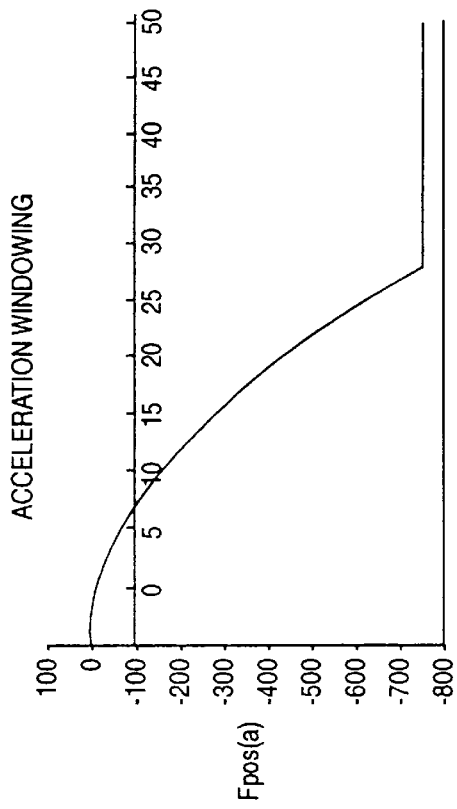
FIGS. 3a, 3b, 3c and 3d are a typical set of polynomial windowing functions in accordance with an embodiment of this invention.
Figure 3D:
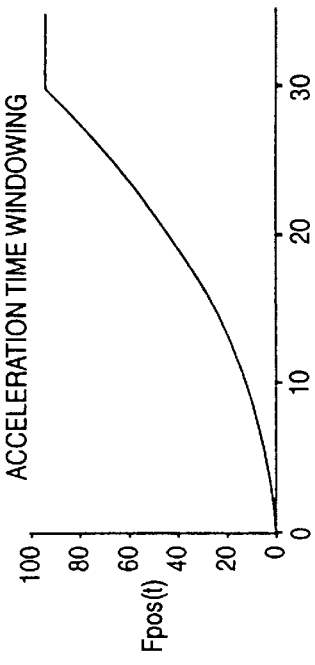
Figure 3A:
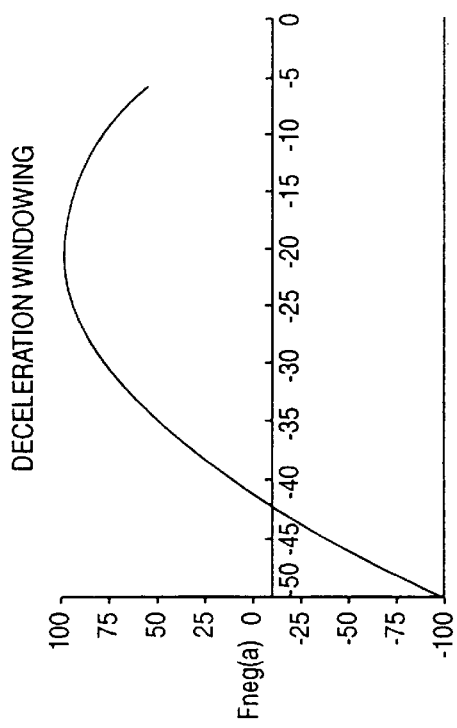
Figure 3C:
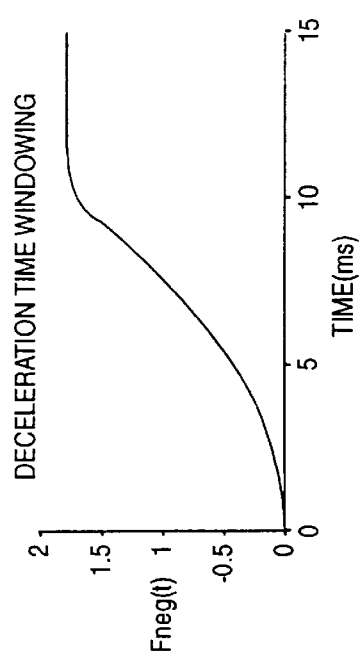
Figure 3E:
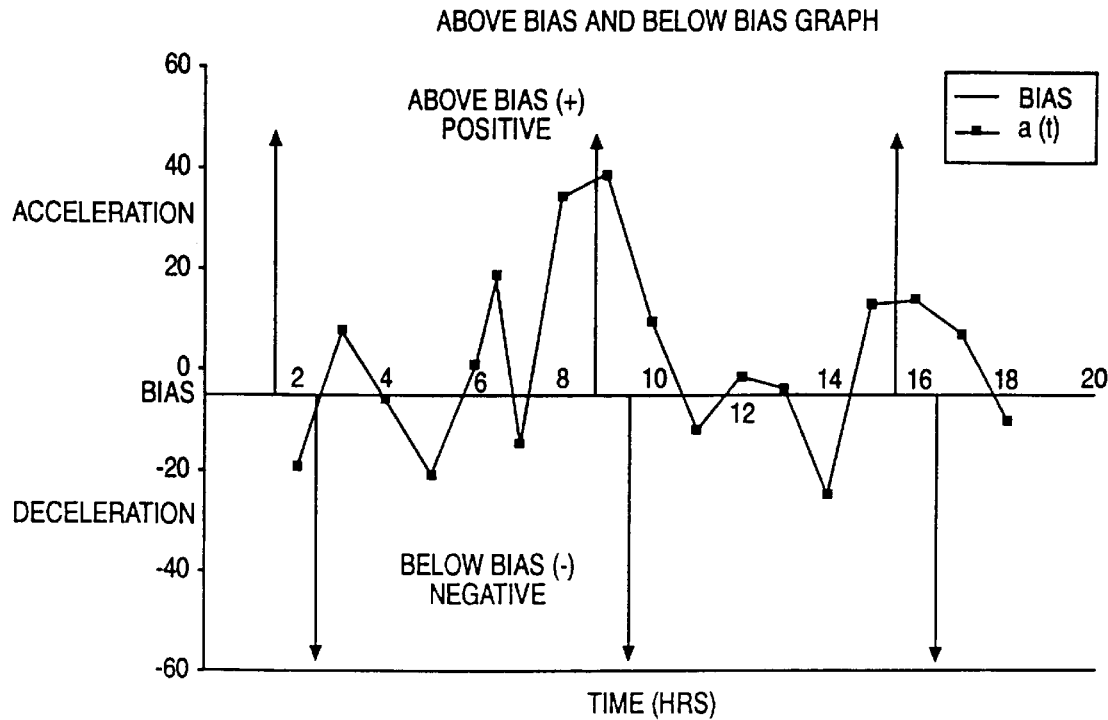
FIGS. 3e and 3f are bias and spike graphs, respectively, with respect to time in accordance with an embodiment of this invention.
Figure 3F:
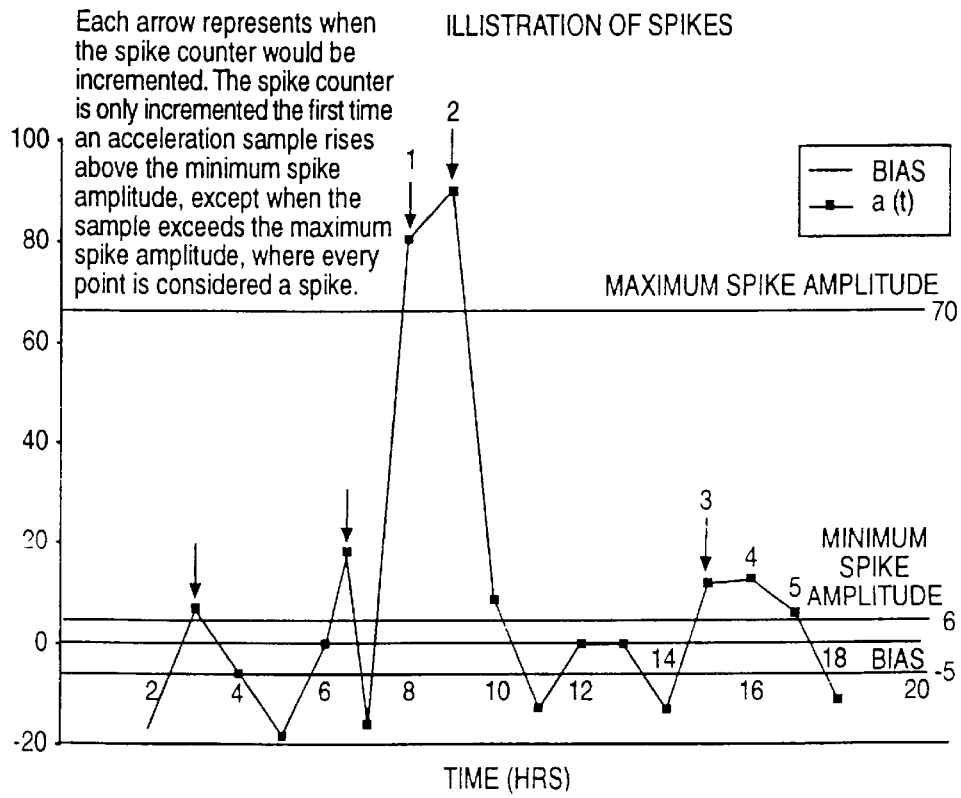

Afterwards, the spike detector routine is run. A spike is either defined to be a positive acceleration of a certain magnitude preceded by any deceleration value, or any positive acceleration value above some preset maximum spike amplitude. Both events mostly occur during side impact, no-activation situations. The spike detection algorithm checks to see if the sample is above the "max spike amplitude". Every point above the maximum spike amplitude is considered a spike, regardless of the previous sample. For example, the spike counter would be incremented at points 1 and 2 in FIG. 3f (corresponding to block 31 of FIG. 2B). If it is below the "max spike amplitude", then it is checked to see if it is above "min spike amplitude" (32) If it is, then one of two cases is present. Either there is already a spike in progress, or this is the beginning of a spike. "Pos spike flag" is checked to see if this is the beginning of a spike, as in point 3 of FIG. 3f. The "pos spike flag" is set to 1 and the spike counter is incremented (blocks 34 and 36 of FIG. 2B). When the algorithm checks points 4 and 5, in FIG. 3f, it will see that the positive spike flag is already set to 1, and that there is a spike already in progress. Therefore, the spike counter will not be incremented for points 4 and 5 in FIG. 3f. After the spike is completed (indicated by a sample below the bias), the spike flag is turned off (block 7A of FIG. 2B). The process continues to join the computation of S(t) for checking against "reset threshold" and "deploy threshold".

Although the preferred embodiment of the present invention has been disclosed, various changes and modifications may be made without departing from the scope of the invention as set forth in the appended claims.

We claim:

1. A method for activating an impact responsive device in a vehicle having an associated single point accelerometer and control module, comprising sensor processing cycle steps of:

discriminating to provide a prediction on when to activate by using a polynomial windowing function of acceleration and time of a signal at a single point sensor location so the polynomial function for acceleration is not monotonically increasing; and using a positive spike detector defining a positive spike either to be a positive acceleration preceded by a deceleration or a positive acceleration value above some preset spike magnitude wherein the number of positive spikes is termed a positive spike count, and an above bias delay detector where the above bias delay detector counts the number of consecutive acceleration samples above a bias value and sets a delay proportional to this number where the device will not activate for this amount of time, defined as an above bias delay, for dynamic side impact and soft crash discrimination.

2. A method for activating an impact responsive device in the vehicle as recited in claim 1, further comprising the steps of:

using the spike detector in order to detect an oscillatory signal in a side impact situation; and using the above bias delay detector to help detect low speed no activate situations to allow a sensor to keep processing even if the sensor knows that it should not activate in the near future.

3. A method as recited in claim 2, further comprising the steps of:

continuously sampling an accelerometer output, a(t), for acceleration below the bias value;

setting the sensor time, t, to 0 when a value is found below the bias value where sensor time is the time since the beginning of a processing cycle;

setting a stop time to a predetermined minimum sensor duration;

determining whether a(t) minus the bias value is negative, then a sensor output, S(t), is computed as a function of the acceleration multiplied by a function of the sensor time t;

sensing a number of consecutive samples above bias and setting the "above bias count" to 0, if a(t) is below the acceleration bias value;

setting the stop time further in the future; and continuing to check for reasons to reset or to continue processing.

4. A method as recited in claim 3, further comprising the steps of:

setting a maximum positive spike count;

checking a "positive spike count" against the maximum positive spike count to make sure that there have not been too many positive spikes;

checking to see if the "above bias delay" detector has set a delay;

defining a preset deployment threshold value for use in determining activation of the impact responsive device;

comparing S(t) to the preset deployment threshold value; and deciding whether to activate or to continue processing the next acceleration sample.

* * * * *